March 17, 1925. 1,529,879
S. DOLNY
NOODLE CUTTER
Filed May 9, 1924
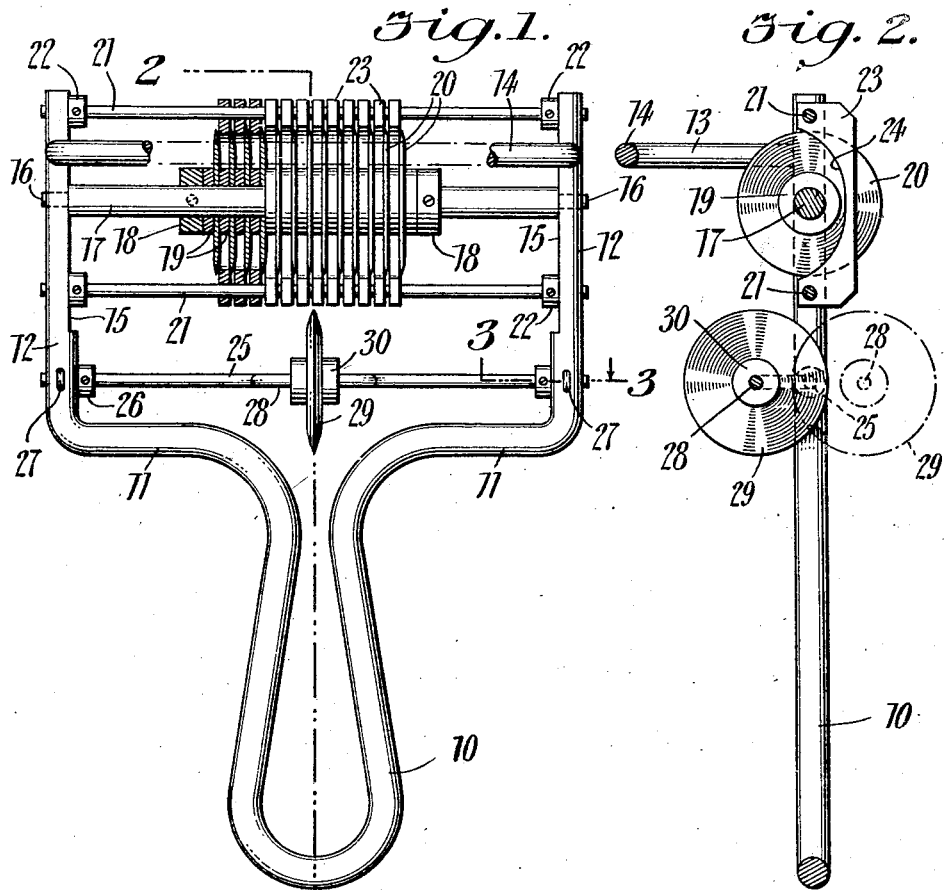
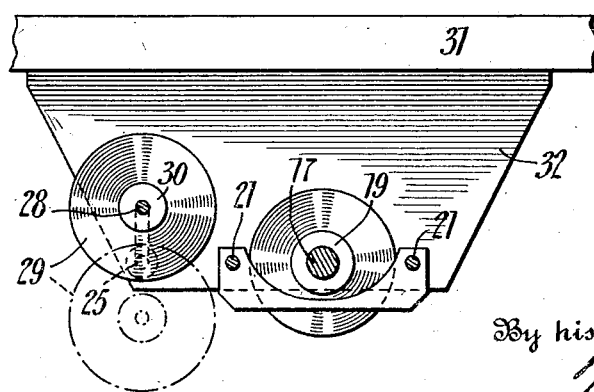
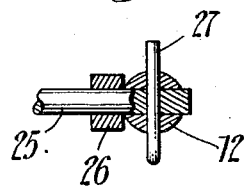
Inventor
Stanislaw Dolny
By his Attorney Patented Mar. 17, 1925.

1,529,879

UNITED STATES PATENT OFFICE.

STANISLAW DOLNY, OF READING, PENNSYLVANIA.

NOODLE CUTTER.

Application filed May 9, 1924. Serial No. 712,024.

*To all whom it may concern:*

Be it known that I, STANISLAW DOLNY, a citizen of United States, residing at Reading, in the county of Berks and State of Pennsylvania, have invented certain new and useful Improvements in Noodle Cutters, of which the following is a specification.

This invention relates to improvements in culinary implements and more particularly to devices for cutting a flat sheet of dough into strips, as in the making of noodles.

One of the objects of the invention is to provide a manually operable apparatus having a plurality of uniformly spaced disc cutters, with means for clearing the sides of the cutters from any adherent particles.

Another purpose is to produce an apparatus which, in addition to the series of spaced cutters, is provided with a single cutter so arranged as to be held in an extended operative position as in trimming the edges of the dough or folded out of the way when not in use.

A further aim is in the provision of an apparatus, easy to operate, cheap to construct and capable of long service.

These several objects are attained by the novel construction, combination and arrangement of parts hereafter described and shown in the accompanying drawing, forming part of this disclosure, and in which—

Figure 1 is a plan view of an embodiment of the invention, parts being broken away to show the construction.

Figure 2 is a longitudinal sectional view taken on line 2—2 of Figure 1.

Figure 3 is a fragmentary transverse sectional view taken on line 3—3 of Figure 1.

Figure 4 is a partial side, partial sectional view, showing a modification in construction.

In the embodiment shown in Figures 1 and 2 the device will be seen to consist of a rigid frame, made from a single strand of round wire bent to form a looped handle 10, convenient in shape and size to be grasped, the end elements 11 of the handle being turned oppositely outward and then bent to extend as parallel sides 12.

Near the outer ends of the sides 12 are secured the ends of a smaller wire 13 disposed at right angles and joined by the bar 14, forming an element to which pressure may be applied in forcing the cutters into the dough.

The inner adjacent side surfaces of the elements 12 are flattened as at 15, and drilled transversely to receive the pintles 16 formed on the ends of a spindle 17, the shoulders of which abut the flat surfaces 12.

Mounted on the spindle 17 are a pair of adjustable collars 18, having between them a plurality of washers 19 and interjacent the washers are circular cutters or discs 20, all of which are freely rotatable on the spindle between the fixed collars 18.

In parallel spaced relation to the spindle 17 are a pair of rods 21, also mounted in the frame sides 12, at uniform distances from the spindle and held from longitudinal displacement by fixed collars 22 abutting the flat inner surfaces of the sides.

Strung on the rods 21 are plates 23, their upper edges being cut out, as at 24 to clear the washers 19, with which they equal in thickness. Thus these plates act as distance pieces, but more particularly as wipers or scrapers for the discs, as the latter are rotated.

Another rod 25 is mounted in the frame sides 12, adjacent the handle elements 11 and held in place by fixed collars 26. The ends of the rod 25 are drilled transversely to agree with similar openings in the frame sides 12 and are receptive of cotter pins 27 which hold the rod in either of its adjusted positions.

The central portion of the rod 25 is bent to form a loop 28 on which is rotatably mounted a single cutting disc 29 flanked by fixed collars 30 and which may be used in trimming the edges of a batch of flattened dough.

Thus the disc when not in use may be raised into the position shown in full lines in Figure 2 or disposed in operative position as indicated by the broken lines in the same figure.

A similar construction is observable in Figure 4 except a plate handle 31 from which extend side plates 32 carrying the spindle 19, rods 21, cutters and scrapers before described and also having mounted between the cutter disc 29 on the looped or cranked portion of the rod 25, it being a matter of choice which of the frame structures are preferable, the operation being essentially the same.

Having thus described my invention, what I claim as new and desire to secure by Letters Patent, is:—

1. A noodle cutter comprising a handled frame, a transverse spindle therein, a series of cutter discs revoluble on the spindle, spacers between said discs, means to confine said discs and spacers on said spindle, a rod fixed in said frame on each side of said spindle, and scraping plates engaged at their ends on said rods to pass between said discs.

2. A noodle cutter comprising a handled frame, a transverse spindle therein, a series of cutter discs revoluble on the spindle, washers interchangeably engaged intermediate said cutters, rods mounted in said frame to extend in uniform spaced relation on both sides of said spindle, wiper plates engaged at their ends on said rods between each pair of discs, said plates being interchangeable and free on the rods, and means for confining said discs in adjustment on said spindle.

3. A noodle cutter comprising a handled frame, a transverse spindle therein, a series of cutter discs revoluble on the spindle, washers interchangeably engaged intermediate said cutters, rods mounted in said frame to extend in uniform spaced relation on both sides of said spindle, wiper plates engaged at their ends on said rods between each pair of discs, said plates being interchangeable and free on the rods, a single rod in said frame, said single rod having a cranked central portion, a cutter disc thereon, and means for rigidly maintaining said disc in either an operative or inoperative position.

In witness whereof I have signed my name to this specification.

Reading, Pa., May 5th, 1924.

STANISLAW DOLNY.